United States Patent Office 3,504,001
Patented Mar. 31, 1970

3,504,001
SYNTHESIS OF MALONONITRILES AND DIMALONONITRILES AND COMPOUNDS PRODUCED THEREIN
Elmore L. Martin, Wilmington, Del., assignor to E. I. du Pont de Nemours and Company, Wilmington, Del., a corporation of Delaware
No Drawing. Filed Dec. 16, 1965, Ser. No. 514,385
Int. Cl. C07c *49/62, 49/68, 121/22*
U.S. Cl. 260—396                     16 Claims

ABSTRACT OF THE DISCLOSURE

Organic nitriles with α-methylene groups can be reacted with an organic carbonate and alkali or alkaline earth metal alkoxide to yield metal derivatives of cyanoesters. Reaction of the metal derivative with a cyanogen halide followed by hydrolysis and decarboxylation gives substituted malononitrile derivatives, which are useful as chemical intermediates. α,α,α',α'-Tetracyanoarylenebisacetate esters which can be made by the above process are useful as photographic developers.

---

This invention relates to a process for the synthesis of organic compounds containing from 1 through 4 terminal malononitrile groups and to certain novel compounds produced therein. It also relates to a process for preparing tetracyanoquinodimethans.

More specifically, the invention is directed to the preparation of malononitrile, substituted malononitriles, di-, tri- and tetra-malononitriles, starting with the corresponding acetonitriles; and in the case of certain arylenedimalononitriles, a further step to prepare tetracyanoquinodimethans. The novel products prepared by the process of the invention are the α,α,α',α'-tetracyanoarylenebisacetate esters in which the trylene group can be further substituted.

The malononitriles prepared by the process of this invention are old compositions of matter finding utility in chemical processes involving reaction of an active hydrogen. They remain more useful for laboratory research interest than as significant items of chemical commerce because presently known preparative methods leave much to be desired as to convenience, efficiency, purity and cost. Similarly, the production of the tetracyanoquinodimethans suffers from the high cost of the malononitrile reactant used to prepare the former and from difficulty in freeing the final product of by-product contamination.

The novel process of this invention affords a simple, relatively inexpensive, high-yield, generically applicable synthesis for preparing malononitriles having 1 through four terminal malononitrile groups.

The process is depicted generically by the following equation:

$$R(-CH_2CH)_n + n(R_1O)_2CO + nMOR_2$$

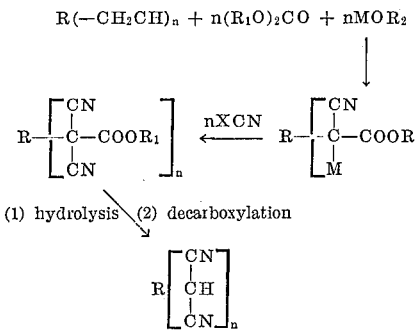

As can be seen, the process involves the reaction of the requisite nitrile (e.g., when $n=2$, a diacetonitrile) having two hydrogens on each α-carbon with suitable esterifying reagents, e.g., with a dihydrocarbyl carbonate [$(R_1O)_2CO$], in the presence of an alkali metal or alkaline earth metal hydrocarbyl oxide ($MOR_2$) to form the corresponding metal derivative of the intermediate cyanoacetates (e.g., when $n=2$, a dihydrocarbyl biscyanoacetate). This intermediate product is reacted under normal metathetical conditions with a cyanogenhalide, e.g., chloride or bromide (XCN) to effect insertion of a second cyano group on each α-carbon, thereby forming the next intermediate product, viz., the dicyanoacetate esters, e.g., when $n=2$, a dihydrocarbyl bis(dicyanoacetate) ester. These, upon aqueous base hydrolysis are converted to the corresponding salts of the free acids which in turn, on acidification with strong aqueous acids, spontaneously decarboxylate to form the desired malononitriles.

In the foregoing equation, $n$ is a cardinal number of 1 through 4, i.e., 1, 2, 3 or 4. Preferably, $n$ is 1 or 2.

When $n$ is 1, R is used to represent hydrogen, alkyl, aryl, cycloalkly, substituted alkyl, substituted aryl, or substituted cycloalkyl, each generally of a total of up to 15 carbons; $R_1$ is used to represent hydrocarbyl generally of up to 10 carbons, preferably alkyl; and $R_2$ is used to represent hydrocarbyl, alike or different from $R_1$ again generally of up to 10 carbons and preferably alkyl; M is used to represent an alkali metal or alkaline earth metal of atomic number 3–56, inclusive, usually of atomic number from 3–20, inclusive, and most especially an alkali metal of atomic number from 11–19, inclusive; X is used to represent a halogen of atomic number from 17–53, inclusive, and preferably of atomic number from 17–35, inclusive.

When $n$ equals 2 or more, R is used to represent alkylene, arylene, cycloalkylene, each of which can contain substituents, generally of a total of up to 15 carbons, with $R_1$, $R_2$, M, and X being as just described when $n$ equals 1. The substituents specifically contemplated in the instances where $n$ equals 1 and $n$ equals 2 or more in the foregoing include alkyl, aryl, halogen (fluorine, chlorine, bromine or iodine), alkoxy, aryloxy, nitrile, halohydrocarbyl, hydrocarbyloxycarbonyl, arylmercapto,

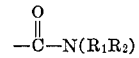

arylsulfonyl, vinyl and vinyloxy. Hydrocarbyl in these substituents is preferably alkyl. As mentioned above, the group R including substituents contains up to 15 carbon atoms.

The instance where R is arylene and $n$ is 2 constitutes a preferred class of reactants because they lead to the tetracyanoquinodimethans through the additional oxidation step included as a part of this invention and because the novel tetracyanoarylenebisacetate ester products of the invention are obtained during the process. The equations representing this preferred embodiment are set forth below wherein Ar represents arylene:

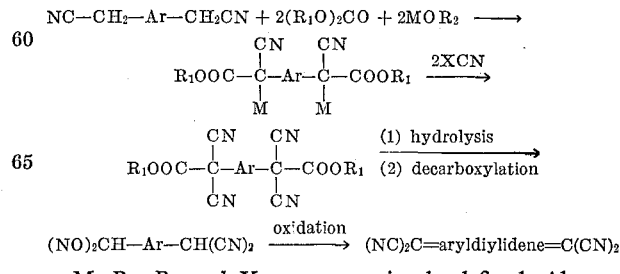

M, $R_1$, $R_2$ and X are as previously defined. Also as previously stated, Ar can contain any of the substituents listed for R.

More specifically, to obtain the tetracyanoquinodimethans, the Ar group represents para-arylene whether the para positions are in the same ring or separated by two rings or more, i.e., para-arylene includes p-phenylene; p,p'-diphenylene, -2,6-naphthalenes, -2,6-anthracenes, -1,4-anthracenes, and the like. Thus, in the preferred embodiment represented by the equations above, aryldiylidene represents a quinoid conjugated bis(divalent) system.

The term "aryldiylidene" or "ardiylidene" is possibly not the best nomenclature for the bridging radical involved. Thus, an alternative and possibly more technically adequate descriptive term would be "cyclodienediylidene," or, in greater detail, unsubstituted and substituted cyclohxeadienediylidene. The only requisite for this bridging radical is that there be present therein at least one six-membered quinoid conjugated ring containing two immediately linked, exocyclic, conjugated double bonds.

The novel products which can be isolated in carrying out this process are those of the formula

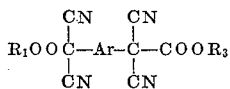

wherein $R_1$ and Ar are as defined above. These $\alpha,\alpha,\alpha',\alpha'$-tetracyanoarylenebisacetate esters are not only useful as intermediates in this process, but are also useful as photographic developers for conventional silver-halide-based film systems, especially as used in aqueous basic solutions.

The new process is particularly outstanding in that it is readily achieved with simple, relatively low-cost, and commercially available materials and involves no especial equipment requirements. Each step of the foregoing described stoichiometry is effected in high yield and high purity under relatively mild reaction conditions. Most surprisingly, the entire process, which may be regarded as requiring three reaction steps (and when Ar is para-arylene and $n$ equals 2, four reaction steps), can be effected sequentially in the same reactor without isolation of any intermediate product or removal of any by-product. This is quite surprising for any multi-step chemical reaction, and is particularly so for the tetracyanoquinodimethan products which are known to be extremely demanding of high chemical purity for all intermediates to prepare a product of desired high purity.

The first step involves insertion of an ester group on a carbon carrying two hydrogens directly linked to a nitrile. This is effected by direct esterification, for instance with a hydrocarbyl carbonate (such as dimethyl-, dioctyl- or dibutyl carbonate) and an alkali metal or alkaline earth metal hydrocarbyloxide such as sodium-, cesium-, or calcium methoxide, ethoxide, decyloxide. Normally, this reaction will be effected in the presence of an inert organic diluent or reaction medium which is present solely to effect adequate mixing of the dihydrogen-bearing acetonitrile and the esterifying coreactants. A particularly preferred class of such reaction media are the organic hydrocarbons, both alkyl and aryl, with preference for the latter. The only reason for choosing one such reaction medium over the other is that of boiling point since in the esterification reaction involved an alcohol is necessarily formed in molar proportions in accordance with the stoichiometry, and to assure maximum completion of the desired reaction said alcohol should be removed from the reaction zone which is most conveniently achieved through the well-known hydrocarbon/alcohol binaries. Thus, the reaction is carried out most simply at reflux of the inert reaction medium being used with portions thereof suitably removed as the reaction is completed in the form of the hydrocarbon/alcohol binary until all of said binary is distilled away from the reaction zone.

The next step of the reaction is a direct metathesis between the first formed dialkali or alkaline earth metal derivative of the α-cyano-substituted acetate ester and a halonitrile, e.g., cyanogen chloride or cyanogen bromide. This is a metathetical reaction and is normally effected without the addition of any further reaction medium over that remaining from the first esterification step. Necessarily in this reaction, equivalent stoichiometric quantities of an alkali metal or alkaline earth metal halide are formed. The by-product salt is most simply removed from the reaction zone by direct treatment with water, but need not necessarily be removed from said zone, and is normally left there in solution in the water.

The next two steps in the synthesis, i.e., the hydrolysis and decarboxylation steps, are effected quite simply and involve only the addition of equivalent stoichiometric portions of a strong base, most conveniently an alkali metal or alkaline earth metal hydroxide such as sodium, potassium, or calcium hydroxide, in aqueous solution, and secondly, again on an equivalent stoichiometric basis, acidification with a strong acid, most conveniently and simply a strong mineral acid (such as HCl, HBr, or HI) in aqueous solution. The reaction times involved in these two steps are extremely short encompassing in each instance from as short a time as a few seconds to at most a few minutes, and accordingly to all intents and purposes, the two can be regarded as essentially a single step, although they must necessarily be carried out sequentially.

In the case where $n$ equals 2, i.e., in the hydrocarbylene and substituted hydrocarbylene dimalononitriles, particularly the arylene and substituted arylene bismalononitriles, the additional step leading to the tetracyanoquinodimethans is an oxidation step and has been described in U.S. Patent 3,115,506. Conventional oxidizing agents are used such as bromine, chlorine, nitric acid (usually in admixture with another strong mineral acid such as HCl).

Reaction temperatures and times are generally quite modest and easily geared to practical syntheses. Generally, the highest temperatures and longest reaction times would be involved in the first, i.e., the esterification, step of the α,α-dihydrogen-bearing acetonitrile. Normally, this reaction will be effected in the broad temperature range 25–200° C. and, practically speaking, will be operated mostly in the ranges from, say, 60–125° C. This reaction, as has been previously mentioned, will normally be effected with excess quantities of an inert organic diluent, most conveniently a hydrocarbon or a hydrocarbon ether or a hydrocarbon ester or the like, frequently also involving, to assure maximum conversion, excess quantities of the esterifying agent. Since molar proportions of a hydrocarbylhydroxy compound, e.g., for instance, an alcohol, resulting from combination of one of the α-hydrogens of the acetonitrile reactant and one of the ester moieties of the esterifying reagent involved is formed in the reaction, a preferred reaction medium will be one which forms with the thus-formed hydroxyhydrocarbyl compound, e.g., an alcohol, a binary or azeotrope which, by distillation from the reaction medium mixture, will assure as far as possible the completion of the esterification reaction.

The second step, i.e., the metathetical reaction with the cyanogen halide to result in the insertion of the second nitrile group on the α-carbon, will normally be effected, at least initially, at reduced temperatures in the range 5–20° C. due to the relatively low boiling nature of the cyanogen halide reactants. Once the cyanogen halide has been charged to the reaction zone and the original exothermic reaction is over, the reaction mixture will normally be heated to temperatures generally below about 100° C. and practically in the range 50–75° C., simply to assure as far as possible the completion of the metathetical reaction. The final two steps towards the formation of the desired malononitrile or dimalononitrile, i.e., the hydrolysis and decarboxylation steps, need generally only be carried out at room temperature although, if required, elevated temperatures in the range from 30 to 100° C. can be used. In those instances involving the arylene-bridged dimalononitriles, the final oxidation step will also normally be effected at ambient or room temperatures, although, if desired, modestly elevated temperatures, again in the range of 30–100° C. can be used.

Although it has been pointed out that one of the most outstanding properties of the present synthesis is that all steps can be carried out sequentially in the same reactor without isolating any of the intermediate products or removing any of the by-products, of course, it is within the purview of this invention that the various process steps can be carried out separately with isolation of each of the intermediates. Under either procedure the over-all process operates at extremely high yields ranging from 85% of theory or higher to form products either at the intermediate scopes or at the final product level of extremely high purity.

The following examples in which the parts given are by weight are submitted to illustrate further but not to limit this invention.

EXAMPLE I

Part A.—Preparation of dimethyl α,α,α′,α′-tetracyano-p-phenylenediacetate

A mixture of 15.6 parts of p-xylylene dicyanide, 13 parts of sodium methylate, 50 parts of dimethyl carbonate, and 60 parts of benzene was refluxed with mechanical stirring under a fractionating column on total reflux for about three hours. The benzene/methanol binary was then removed by distillation over the course of about one hour, during which time 30 to 40 parts of additional benzene was added. The distillation was then continued for an additional hour to make sure all the binary had been removed, during which time essentially pure benzene distilled over. The resulting thick yellow suspension of the disodium derivative of dimethyl α,α′-dicyano-p-phenylenediacetate was cooled to 5° C. and the fractionating column was replaced wtih a solid carbon dioxide/acetone reflux condenser maintained at −20° C. Cyanogen chloride (19 parts) was distilled into the thick suspension at a temperature of 5–10° C., said temperature being maintained by controlling the rate of addition of the cyanogen chloride and suitable external cooling of the reactor with a solid carbon dioxide/acetone bath. As soon as the addition of the cyanogen chloride was completed, the cooling bath was removed and the temperature of the reaction mixture was allowed to increase to 20–25° C. over a period of about 0.5 hour. The reaction temperature was increased by external heating to 55–60° C. over a period of about an additional hour and maintained at this temperature for another hour. The essentially colorless, neutral reaction mixture was evaporated to dryness under reduced pressure. The resulting solid mixture of dimethyl α,α,α′,α′ - tetracyano - p - phenylenediacetate and sodium chloride was stirred for several minutes with cold water to dissolve the latter, the mixture was filtered, and the filter cake was washed with cold water. The moist filter cake was dissolved in methylene chloride, the aqueous layer was separated, and the organic layer was dried with anhydrous magnesium sulfate. The drying agent was removed by filtration and the filtrate was concentrated under reduced pressure until crystals began to separate. Then, diethyl ether was added whereupon the dimethyl α,α,α′,α′-tetracyano-p-phenylenediacetate crystallized rapidly. After cooling in a wet ice/salt mixture, the colorless crystals were collected and washed with cold diethyl ether on the filter. There was thus obtained 24 parts (75% of theory) of dimethyl α,α,α′,α′-tetracyano-p-phenylenediacetate melting at 178–180° C. An additional four parts (13% of theory) was obtained by working up the mother liquors.

*Analysis.*—Calcd. for $C_{16}H_{10}O_4N_4$ (percent): C, 59.6; H, 3.1; N, 17.4. Found (percent): C, 60.2; H, 3.0; N, 17.8.

Part B.—Preparation of 1,4-bis(dicyanomethyl)benzene

To three parts of a 10% aqueous solution of potassium hydroxide was added 0.1 part of the above dimethyl α,α,α′,α′-tetracyano-p-phenylenediacetate and the resulting mixture was stirred vigorously whereupon a homogeneous solution was obtained in about 10 seconds. After about 30 seconds the solution was acidified by the addition of 6 N aqueous hydrochloric acid whereupon carbon dioxide was evolved and 1,4-bis(dicyanomethyl)benzene precipitated. The precipitate was collected by filtration, washed free of acid with cold water, and recrystallized from ethanol. The resulting colorless 1,4-bis(dicyanomethyl)benzene melted at 240–242° C. with decomposition and exhibited an IR spectrum identical with that of a sample of 1,4-bis-(dicyanomethyl)benzene prepared as described in U.S. Patent 3,115,506.

Part C.—Preparation of 7,7,8,8-tetracyanoquinodimethan

To 30 parts of a 10% aqueous solution of potassium hydroxide was added 3.22 parts of the above dimethyl α,α,α′,α′-tetracyano - p - phenylenediacetate. After stirring for about 15 seconds, a homogeneous solution was obtained. At the end of one minute the solution was acidified by the addition of 11 parts of 6 N aqueous hydrochloric acid whereupon carbon dioxide was evolved and 1,4-bis(dicyanomethyl)benzene was precipitated. A solution of 2 parts of bromine in 100 parts of water was added rapidly whereupon the colorless 1,4-bis(dicyanomethyl)-benzene was converted to the yellow 7,7,8,8-tetracyanoquinodimethan (TCNQ). After stirring for five minutes, the resultant yellow precipitate was collected, washed thoroughly with cold water, and recrystallized from methylene chloride. The yield of TCNQ was 2 parts (98% of theory). The IR spectrum of the product was identical with that of a sample of TCNQ prepared as described in U.S. Patent 3,115,506.

EXAMPLE II

Part A.—Preparation of dimethyl α,α,α′,α′-tetracyano-2,5-dimethoxy-1,4-phenylenediacetate A mixture of 10.8 parts of 2,5-dimethoxy-1,4-xylylene dicyanide, 8 parts of sodium methylate, and 75 parts of dimethyl carbonate was refluxed with mechanical stirring for 0.5 hour. Benzene (100 parts total) was then added in four equal portions at 15-minute intervals while maintaining the reflux. After refluxing for an additional period of 1.5 hours, the benzene/methanol binary was removed during the course of 1.5 hours. Distillation was continued for an additional 0.5 hour to make sure all of the benzene/methanol binary was removed, during which time essentially pure benzene distilled over. The resulting thick yellow suspension of the disodium derivative of dimethyl α,α′ - dicyano - 2,5 - dimethoxy - 1,4 - phenylenediacetate was cooled to 5° C. Cyanogen chloride (18 parts) was then distilled substantially as in Example I into the thick suspension, maintained at a temperature of 5–10° C. by suitable external cooling. When the addition of the cyanogen chloride was completed, the temperature of the reaction mixture was raised to 65° C. over a period of one hour. The reaction mixture was then allowed to cool to room temperature and stirring was continued under these conditions for 15 hours. The essentially colorless, neutral reaction mixture was evaporated to dryness under reduced pressure and the resulting solid mixture of dimethyl α,α,α′,α′ - tetracyano - 2,5 - dimethoxy - 1,4 - phenylenediacetate and sodium chloride was stirred with cold water to dissolve the latter. The solid precipitate of the diacetate was collected by filtration, washed well with cold water, air-dried, and finally dried over phosphorus pentoxide under reduced pressure. There was thus obtained 19 parts (100% of theory) of dimethyl α,α,α′,α′-tetracyano-2,5-dimethoxy-1,4-phenylenediacetate.

Part B.—Preparation of 7,7,8,8-tetracyano-2,5-dimethoxyquinodimethan

To five parts of a 10% aqueous solution of potassium hydroxide was added 0.5 part of the above dimethyl, α,α,α′,α′-tetracyano - 2,5 - dimethoxy-1,4-phenylenediacetate and the resulting mixture was warmed with stirring on a steam bath for a few seconds whereupon a homogeneous solution was obtained. The solution was acidified by the addition of two parts of aqueous 6 N hydrochloric acid whereupon carbon dioxide was evolved and 1,4-bis(dicyanomethyl)-2,5-dimethoxybenzene precipitated as a colorless solid. About 200 parts of a saturated aqueous solution of bromine was then added and the mixture was stirred for about 10 minutes, during which time the colorless dihydro compound was oxidized to the orange-colored quinodimethan. The colored product was collected by filtration, washed thoroughly with cold water, and crystallized from methylene chloride to give pure 7,7,8,8 - tetracyano-2,5-dimethoxyquinodimethan as deep red crystals melting at 305° C. with decomposition and exhibiting an IR spectrum consistent with the tetracyano-dimethoxyquinodimethan structure.

*Analysis.*—Calcd. for $C_{14}H_8O_2N_4$ (percent): C, 63.6; H, 3.0; N, 21.2. Found (percent): C, 63.3; H, 2.8; N, 21.2.

EXAMPLE III

Part A.—Preparation of dimethyl α,α,α′,α′-tetracyano-2,5-diisopropyl-1,4-phenylenediacetate A mixture of 24 parts of 2,5-diisopropyl-1,4-xylylene dicyanide, 100 parts of dimethyl carbonate, and 14 parts of sodium methylate was stirred for about 10 minutes, during which time the temperature increased to 50° C. and the reaction mixture thickened. Benzene (40 parts) was then added and stirring continued. After about 0.5 hour an additional 50 parts of dimethyl carbonate and 40 parts of benzene was added to assure efficient stirring. The reaction mixture was heated at the reflux for about three hours and the benzene/methanol binary was then removed by distillation during a period of approximately one hour. Distillation was continued for approximately an additional hour to make certain that all the benzene/methanol binary had been removed, during which hour essentially pure benzene distilled over. The resulting thick yellow suspension of the disodium derivative of dimethyl α,α,α′,α′-tetracyano - 2,5 - diisopropyl-1,4-phenylenediacetate was cooled to 5° C. and 19 parts of cyanogen chloride was added essentially as described in Example I at 5–10° C. A slight exothermic reaction occurred increasing the reaction temperature to 30° C., and as soon as the exothermic reaction ceased the reaction temperature was raised to 50° C. during the course of 30 minutes. The reaction mixture was then allowed to cool to 25° C. and stirred for an additional 15 hours. The essentially colorless, neutral reaction mixture was evaporated to dryness under reduced pressure and the resulting mixture of dimethyl α,α,α′α′-tetracyano-2,5-diisopropyl-1,4-phenylenediacetate and sodium chloride was stirred with cold water to dissolve the latter. The diacetate was collected by filtration, washed with cold water, and air-dried. After drying under reduced pressure over phosphorus pentoxide, there was thus obtained 39 parts (99% of theory) of dimethyl α,α,α′α′-tetracyano-2,5-diisopropyl - 1,4 - phenylenediacetate as a faintly green solid.

Part B.—Preparation of 7,7,8,8-tetracyano-2,5-diisopropylquinodimethan

To 4.06 parts of the above dimethyl α,α,α′,α′-tetracyano-2,5-diisopropyl-1,4-phenylenediacetate was added 40 parts of a 10% aqueous solution of potassium hydroxide and the resulting mixture was refluxed with stirring for about two minutes whereupon a homogeneous solution was obtained. The resulting solution was cooled to 25° C. and acidified by the addition of 14 parts of aqueous 6 N hydrochloric acid whereupon carbon dioxide was liberated and 2,5-diisopropyl-1,4-bis(dicyanomethyl)benzene precipitated out. An aqueous solution of about 2 parts of bromine in 100 parts of water was added and the mixture was stirred for five minutes. The reaction mixture was then filtered, the filter cake was washed thoroughly with cold water, and then dissolved in methylene chloride. The resulting methylene chloride solution was dried with anhydrous magnesium sulfate. The latter drying agent was then removed by filtration and the resultant clear filtrate concentrated to a small volume during which time colorless crystals of 2,5-diisopropyl-1,4-bis(dicyanomethyl)benzene separated. These are collected and washed free of the yellow 7,7,8,8-tetracyano-2,5-diisopropylquinodimethan with methylene chloride. The recovered yield of 2,5-diisopropyl-1,4-bis(dicyanomethyl)benzene is one part melting at 262–264° C.

*Analysis.*—Calcd. for $C_{18}H_{18}N_4$ (percent): C, 74.4; H, 6.8; N, 19.3. Found (percent): C, 74.2; H, 6.3% N, 19.4.

The above yellow filtrate was concentrated to a small volume and diethyl ether was added slowly with continued concentration. Bright yellow crystals of the tetracyanodiisopropylquinodimethan product separated were removed by filtration, and were finally washed with diethyl ether. After drying there was thus obtained 0.9 part of pure 7,7,8,8-tetracyano-2,5-diisopropylquinodimethan as bright yellow crystals melting at 193–195° C. and exhibiting IR and n-m-r spectra consistent with the quinodimethan structure.

*Analysis.*—Calcd. for $C_{18}H_{16}N_4$ (percent): C, 75.0; H, 5.6; N, 19.4. Found (percent): C, 75.0; H, 5.7; N, 19.7.

EXAMPLE IV

Part A.—Preparation of dimethyl α,α,α′,α′-tetracyano-2,5-dichloro-1,4-phenylenediacetate A mixture of 10 parts of 2,5-dichloro-1,4-xylylene dicyanide, 75 parts of dimethyl carbonate, and 5.4 parts of sodium methylate was stirred for about 10 minutes, during which time the temperature increased to 35° C. and the reaction mixture thickened. The temperature was then increased to 80° C. and 20 parts of benzene was added. To the resulting gummy mass was added four parts of methanol and the reaction mixture refluxed with stirring for two hours. While maintaining the same temperature, the benzene/methanol binary was then removed over a period of one hour and the resulting lumpy reaction mixture was slurried in a high-speed blender. The resultant, smooth, fine suspension of the disodium derivative of α,α′-dicyano-2,5-dichloro - 1,4 - phenylenediacetate was maintained at take-off reflux at the same reaction temperature for a period of two hours, during which time essentially pure benzene distilled, thereby assuring complete removal of the benzene/methanol binary. The reaction mixture was cooled to 5° C. and 12 parts of cyanogen chloride was distilled into the slurry at 5–10° C. substantially as described in Example I. After warming to 30° C. during the course of about two hours, the reaction mixture was slurried at 25° C. for an additional period of 15 hours. The resulting essentially colorless, neutral reaction mixture was evaporated to dryness under reduced pressure and the resulting mixture of dimethyl α,α,α′,α′-tetracyano-2,5-dichloro-1,4 - phenylene diacetate and sodium chloride was stirred well with cold water to dissolve the latter. The remaining solid diacetate was collected by filtration, washed well with cold water, and finally air-dried. There was thus obtained dimethyl α,α,α′,α′-tetracyano-2,5-dichloro-1,4-phenylenediacetate, 14 parts (90% of theory), as a pale green solid.

Part B.—Preparation of tetracyano-2,5-dichloroquinodimethan

To 3.91 parts of the above dimethyl α,α,α′,α′-tetracyano-2,5-dichloro-1,4-phenylenediacetate was added 40 parts of a 10% aqueous solution of potassium hydroxide and 40 additional parts of water. The resulting mixture was warmed on a steam bath with stirring for about 15 seconds resulting in a homogeneous solution. The latter was then cooled to 25° C. and acidified by the addition of 14 parts of 6 N aqueous hydrochloric acid whereupon carbon dioxide was evolved and 2,5-dichloro-1,4-bis(dicyanomethyl)benzene was precipitated.

A solution of about two parts of bromine in 100 parts of water was added and the reaction mixture was stirred for several minutes, then filtered, and the resultant solid filter cake was washed thoroughly with cold water and finally dissolved in methylene chloride. The methylene chloride solution was dried over anhydrous magnesium sulfate. The drying agent was removed by filtration, and the filtrate was concentrated to a small volume during which time yellow crystals of 7,7,8,8-tetracyano-2,5-dichloroquinodimethan separated. The crystals were collected by filtration, washed with methylene chloride, and finally recrystallized a second time from methylene chloride essentially as described above. There was thus obtained, after filtration and drying, 0.35 part of pure 7,7,8,8-tetracyano-2,5-dichloroquinodimethan as yellow crystals melting at 305° C. with decomposition.

*Analysis.*—Calcd. for $C_{12}H_2Cl_2N_4$ (percent): C, 52.8; H, 0.7; N, 20.5. Found (percent): C, 53.0; H, 1.1; N, 20.7.

EXAMPLE V

Part A.—Preparation of methyl α,α-dicyanophenylacetate

A mixture (charged at room temperature) of 35 parts of phenyl acetonitrile, 100 parts of dimethyl carbonate, 60 parts of benzene, and 20 parts of sodium methylate was stirred for about 10 minutes, during which time the temperature increased to 57° C. As soon as the exothermic reaction ceased, the reaction mixture was heated to the reflux whereupon, first, a homogeneous solution was obtained. After a few minutes' continued heating, the sodium derivative of methyl α-cyanophenylacetate began to separate and a thick reaction mixture was obtained which was refluxed for 0.5 hour. The benzene/methanol binary was removed by maintaining the reaction temperature at about 80° C. over a period of the next two hours, during which time additional benzene was added in order to assure efficient stirring. The resultant reaction mixture was cooled to 5° C. and 30 parts of cyanogen chloride was distilled into the stirred reaction mixture which was maintained at 6–8° C. by external cooling. The reaction mixture after the addition was maintained at 10–11° C. for one hour and gradually warmed to 50° C. during the course of an additional hour. The reaction mixture was then cooled to 25° C. and stirred for an additional 15 hours. The resulting colorless, neutral reaction mixture was freed of benzene and excess dimethyl carbonate by evaporation to dryness at reduced pressure. The resulting solid mixture of methyl α,α-dicyanophenyl acetate and sodium chloride was stirred with a mixture of water and petroleum ether, and the resultant solid dimethyl α,α-dicyanophenylacetate was collected by filtration and crystallized from methanol to afford 51 parts (85% of theory) of methyl α,α-dicyanophenylacetate as colorless crystals melting at 41.5–42.5° C.

*Analysis.*—Calcd. for $C_{11}H_8O_2N_2$ (percent): C, 66.0; H, 4.0; N, 14.0. Found (percent): C, 65.7; H, 3.8; N, 14.1.

Part B.—Preparation of phenylmalononitrile

To 10 parts of the above methyl α,α-dicyanophenylacetate was added 110 parts of a 10% aqueous solution of potassium hydroxide and the mixture was stirred for about one minute, whereupon a homogeneous solution was obtained. The solution was acidified by the addition of 40 parts of aqueous 6 N hydrochloric acid whereupon carbon dioxide was evolved and crystals of phenylmalononitrile precipitated. The precipitate was extracted with diethyl ether and the resultant ether solution was dried and concentrated under reduced pressure at 50° C. The concentrate was cooled to room temperature and the resulting solid removed by filtration. There was thus obtained 7 parts (100% of theory) of phenylmalononitrile exhibiting an IR spectrum identical to that of a known sample of phenylmalononitrile.

EXAMPLE VI

Part A.—Preparation of diethyl α,α,α′,α′-tetracyano-p-phenylenediacetate

A mixture of 47 parts of p-xylene dicyanide, 200 parts of diethyl carbonate, and 40 parts of sodium methylate was stirred until the exothermic reaction ceased. About 250 parts of benzene was added slowly, whereupon a gum separated which on standing soon solidified. The thick reaction mixture was refluxed for three hours, and the benzene/ethanol binary was then removed by distillation, as before with the methanol binaries, over a period of one hour. The resulting suspension of the disodium derivative of diethyl α,α′-dicyano-p-phenylenediacetate was cooled to 5° C. and 60 parts of cyanogen chloride was distilled into the reaction mixture at 8–10° C. as maintained by external cooling. The reaction mixture was warmed to 40° C. over a period of one hour and stirred for an additional 15 hours at 25° C. The colorless, neutral reaction mixture was evaporated to dryness under reduced pressure and the resultant residue was stirred with petroleum ether to remove traces of excess diethyl carbonate. The resultant solid was removed by filtration and dried under reduced pressure over phosphorus pentoxide. There was thus obtained 146 parts (100% of theory) of a mixture of diethyl α,α,α′,α′-tetracyano-p-phenylenediacetate (105 parts) and sodium chloride (41 parts).

Part B.—Preparation of 7,7,8,8-tetracyanoquinodimethan

To 4.87 parts of the above diethyl α,α,α′,α′-tetracyano-p-phenylenediacetate/sodium chloride mixture (3.50 parts/1.37 parts, respectively) was added 40 parts of a 10% aqueous solution of potassium hydroxide. The mixture was slurried for about 15 seconds, whereupon a homogeneous solution was obtained. The solution was acidified by the addition of 14 parts of aqueous 6 N hydrochloric acid, whereupon carbon dioxide was evolved and 1,4-bis(dicyanomethyl)benzene was precipitated. A solution of about two parts of bromine in 100 parts of water was added and the resulting yellow 7,7,8,8-tetracyanoquinodimethan was removed by filtration, washed thoroughly with water, and crystallized from methylene chloride. There was thus obtained after filtration and drying 1.6 parts (80% of theory) of pure 7,7,8,8-tetracyanoquinodimethan as tan crystals.

EXAMPLE VII

To 0.1 part of dimethyl α,α,α′,α′-tetracyano-p-phenylenediacetate, prepared for instance as in Example I of the foregoing, was added 3 parts of a 10% aqueous solution of potassium hydroxide. The mixture was stirred for about 15 seconds and the resulting homogeneous solution was acidified by addition of about one part of aqueous 6 N hydrochloric acid, whereupon carbon dioxide was evolved and 1,4-bis(dicyanomethyl)benzene precipitated out. Chlorine gas was passed slowly into the reaction mixture until the said mixture was saturated with chlorine. The resulting yellow solid was removed by filtration, washed with cold water, and finally dried. There was thus obtained 7,7,8,8-tetracyanoquinodimethan which exhibited an IR spectrum identical with that of a sample of TCNQ prepared as described in U.S. Patent 3,115,506.

EXAMPLE VIII

To 0.1 part of dimethyl α,α,α′,α′-tetracyano-p-phenylenediacetate was added 3 parts of a 10% aqueous solution of potassium hydroxide. The mixture was stirred for about 15 seconds and the resulting homogeneous solution was acidified by the addition of about one part of aqueous 6 N hydrochloric acid, whereupon carbon dioxide was evolved and 1,4-bis(dicyanomethyl)benzene precipitated out. About one part of aqueous 6 N nitric acid was added with stirring, and the resulting reaction mixture was stirred for about 10 minutes at room temperature. The resulting yellow precipitate was collected by filtration, washed thoroughly with cold water, and dried. There was thus obtained 7,7,8,8-tetracyanoquinodimethan exhibiting an IR spectrum identical with that from a sample of TCNQ prepared as described in U.S. Patent 3,115,506.

EXAMPLE IX

Part A.—Preparation of dimethyl α,α,α',α'-tetracyano-2,5-dimethyl-1,4-phenylenediacetate A mixture of 24 parts of 2,5-dimethyl-1,4-xylylene dicyanide, 125 parts of dimethyl carbonate and 18 parts of sodium methylate was stirred at 70–80° C. whereupon a homogeneous solution was obtained. After about five minutes, the disodium derivative of dimethyl α,α'-dicyano 2,5-dimethyl-1,4-phenylenediacetate crystallized and it was necessary to add about 125 parts of benzene during the course of one hour to assure efficient stirring. The reaction mixture was heated at reflux for about two hours and the benzene/methanol binary was then removed by distillation during the period of approximately one hour. Distillation was continued for approximately an additional hour to make certain that all of the benzene/methanol binary had been removed, during which hour essentially pure benzene distilled over. The resulting thick suspension of the disodium derivative of dimethyl α,α'-dicyano-2,5-dimethyl-1,4-phenylenediacetate was cooled to 5° C. and 30 parts of cyanogen chloride was added essentially as described in Example I at 5–10° C. The reaction temperature was raised to 25° C. and the mixture was stirred for a total of 15 hours at 25° C. The essentially colorless, neutral reaction mixture was evaporated to dryness under reduced pressure. There was thus obtained 60 parts (100% of theory) of a mixture of dimethyl α,α,α',α'-tetracyano-2,5-dimethyl-1,4-phenylenediacetate (45 parts) and sodium chloride (15 parts).

Part B.—Preparation of 7,7,8,8-tetracyano-2,5-dimethylquinodimethan

To 3.5 parts of the above dimethyl α,α,α',α'-tetracyano-2,5-dimethyl-1,4-phenylenediacetate was added 40 parts of a 10% aqueous solution of potassium hydroxide and the resulting mixture was warmed gently on a steam bath with stirring whereupon a homogeneous solution was obtained. The resulting solution was cooled to 25° C. and acidified by the addition of 14 parts of aqueous 6 N hydrochloric acid whereupon carbon dioxide was liberated and 2,5 - dimethyl - 1,4-bis(dicyanomethyl)benzene precipitated out. An aqueous solution of about 2 parts of bromine in 100 parts of water was added and the mixture was stirred for ten minutes. The reaction mixture was filtered, the filter cake was washed thoroughly with cold water, and then dissolved in methylene chloride. The resulting methylene chloride solution was dried with anhydrous magnesium sulfate. The latter drying agent was then removed by filtration and the resultant clear filtrate was concentrated to a small volume, during which time yellow crystals of 7,7,8,8-tetracyano-2,5-dimethylquinodimethan separated. After cooling to room temperature, the crystals were collected, washed with cold methylene chloride, and dried. The yield was 2 parts (87% of theory) and the IR spectrum of the product was identical with that of a sample of 7,7,8,8-tetracyano-2,5-dimethylquinodimethan prepared as described by J. Diekmann, W. R. Hertler and R. E. Benson, J. Org. Chem. 28, 2719 (1963).

In addition to the foregoing detailed exemplary disclosure, the process of the present invention is broadly applicable to many other specific compounds. Suitable specific compounds further illustrative of the generic scope of this invention follow. In all instances the process conditions and stoichiometry are those discussed in detail in the foregoing. Thus, from 2-cyano-p-xylyene dicyanide, potassium dodecyloxide, dibenzyl carbonate, cyanogen bromide, aqueous calcium hydroxide, and aqueous sulfuric acid there will be obtained didodecyl 2-cyano-1,4-phenylenebis(cyanoacetate), 2 - cyano - 1,4 - phenylenedimalononitrile, and, finally, 2-cyano-7,7,8,8-tetracyanoquinodimethan. From 2,5-dicyano-p-xylene dicyanide, sodium benzyloxide, diisopropyl carbonate, cyanogen chloride, and aqueous base and acid there will be obtained disopropyl 2,5-dicyano-1,4-phenylenebis-(cyanoacetate), from which is obtained 2,5-dicyano-1,4-phenylenedimalononitrile from which an oxidation is obtained 2,5,7,7,8,8-hexacyanoquinodimethan.

Similarly, from 2-butoxycarbonyl-p-xylyene dicyanide, lithium methoxide, dioctyl carbonate, cyanogen bromide and aqueous base and acid there will be obtained dioctyl 2-butoxycarbonyl-1,4-phenylenebis(cyanoacetate), from which is obtained 2-butoxycarvonyl-1,4-phenylenedimalononitrile from which will be obtained 2-butoxycarbonyl-7,7,8,8-tetracyanoquinodimethan.

From 2,5 - dipropoxycarbonyl-p-xylylene dicyanide, sodium cyclohexyloxide, dipropyl carbonate, and cyanogen chloride and aqueous base and acid there will be obtained dipropyl 2,5-dipropoxycarbonyl-1,4-phenylenebis(cyanoacetate) from which will be obtained 2,5-dipropoxycarbonyl-1,4-phenylenedimalononitrile from which will be obtained 2,5-dipropoxycarbonyl-7,7,8,8-tetracyanoquinodimethan.

Similarly, from 2-fluoro-p-xylylene dicyanide, di-n-butyl carbonate, sodium butoxide, and cyanogen chloride and aqueous base and acid there will be obtained dibutyl 2-fluoro-1,4-phenylenebis(cyanoacetate) from which will be obtained 2-fluoro-1,4-phenylenedimalononitrile from which will be obtained 2-fluoro-7,7,8,8-tetracyanoquinodimethan.

Similarly, from 2,5-difluoro-p-xylylene dicyanide, sodium pentoxide, dipentyl carbonate, and bromocyanogen, and aqueous base and acid there will be obtained dipentyl 2,5 - difluoro - 1,4-phenylenebis(cyanoacetate) from which will be obtained 2,5-difluoro-1,4-phenylenedimalononitrile from which will be obtained 2,5-difluoro-7,7,8,8-tetracyanoquinodimethan.

Similarly, using the corresponding 2,3,5-trifluoro and 2,3,5,6-tetrafluoro-p-xylylene dicyanides and the just enumerated reactants there will be obtained, respectively, the corresponding diamyl 2,3,5-trifluoro- and 2,3,5,6-tetrafluoro-1,4 - phenylenebis(cyanoacetates), 2,3,5 - trifluoro- and 2,3,5,6-tetrafluoro-1,4-phenylenedimalononitriles, and 2,3,5-trifluoro- and 2,3,5,6-tetrafluoro-7,7,8,8-tetracyanoquinodimethans.

Similarly, using 2-trifluoromethyl- and 2,5bis(trifluoromethyl)-p-xylene dicyanides, dimethyl carbonate, sodium methoxide, and cyanogen chloride, and aqueous base and acid there will be obtained dimethyl 2-trifluoromethyl- and 2,5 - bis(trifluoromethyl)-1,4-phenylenebis(cyanoacetates), 2-trifluoromethyl- and 2,5-bis(trifluoromethyl)-1, 4-phenylenedimalononitriles, and 2-trifluoromethyl- and 2,5 - bis(trifluoromethyl) - 7,7,8,8-tetracyanoquinodimethans.

Similarly, using 2-phenylmercapto- or 2-phenylsulfonyl-p-xylylene dicyanide, cesium methylate, diphenyl carbonate, and cyanogen chloride and aqueous base and acid there will be obtained, respectively, diphenyl 2-phenylmercapto- and 2-phenylsulfonyl-1,4-phenylenebis(cyanoacetates) and 2-phenylmercapto- and 2-phenylsulfonyl-1,4-phenylenedimalononitriles and 2-phenylmercapto- and 2-phenylsulfonyl-7,7,8,8-tetracyanoquinodimethans.

Similarly, using 2-dimethylcarbamoyl and 2,5-bis-(dimethylcarbamoyl)-p-xylylene dicyanides, dimethyl carbonate, sodium methoxide, and cyanogen chloride and aqueous base and acid there will be obtained, respectively, dimethyl 2-dimethylcarbamoyl- and 2,5-bis(dimethylcarbamoyl)-1,4-phenylenebis(cyanoacetates), 2-dimethylcarbamoyl- and 2,5 - bis(dimethylcarbamoyl)-1,4-phenylenedimalononitriles and 2-dimethylcarbamoyl and 2,5- bis(dimethylcarbamoyl) - 7,7,8,8 - tetracyanoquinodimethans.

Similarly, using m-xylene and o-xylene dicyanides, sodium methoxide, dimethyl carbonate, and cyanogen chloride and aqueous base and acid there will be obtained, respectively, dimethyl m- and o-phenylenebis(cyanoacetates) and m- and o-phenylenebisdimalononitriles.

Similarly, using 5-chloro-m-xylylene dicyanide and 4,5-dichloro-o-xylylene dicyanide, sodium methoxide, dimethyl carbonate, and cyanogen chloride and aqueous base and acid there will be obtained, respectively, dimethyl 5-chloro-m-phenylenebis(cyanoacetate) and dimethyl 4,5-dichloro-o-phenylenebis(cyanoacetate) and 5-chloro-m-phenylenedimalononitrile and 4,5-dichloro-o-phelylenedimalononitrile.

In like fashion using 5,10-anthylenediacetonitrile, sodium methoxide, dimethyl carbonate, and cyanogen chloride and aqueous base and acid there will be obtained dimethyl 5,10-anthrylenebis(cyanoacetate), 5,10-anthrylene dimalononitrile, and 15,15,16,16-tetracyanoanthra-5,10-quinodimethan. Quite similarly, using 9,10-phenanthrylenediacetonitrile, sodium methoxide, dimethyl carbonate, and cyanogen chloride, and aqueous base and acid there will be obtained dimethyl 9,10-phenanthylenebis(cyanoacetate), 9,10 - phenanthylenedimalononitrile, and 15,15,16,16 - tetracyanophenantra - 9,10 - quinodimethan. Similarly, from 1,12-diphenyldiacetonitrile, diethyl carbonate, sodium ethoxide, and cyanogen chloride, and aqueous base and acid, there will be obtained diethyl 1,12-diphenylenebis(cyanoacetate), 1, 12-diphenylenedimalononitrile, and 13,13,14,14-tetracyanodipheno-1,12-quinodimethan.

Similarly, from 2,6-napthalenediacetonitrile, sodium ethylate, diethyl carbonate, and cyanogen chloride and aqueous base and acid there will be obtained diethyl 2,6-naphthylenebis(cyanoacetate), 2,6-naphthylenedimalononitrile, and 11,11,12,12-tetracyanonaphtho-2,6-quinodimethan.

Similarly, from 1,3,5-benzenetris(acetonitrile), and 1,2,4,5-benzenetetrakis(acetonitrile), sodium methoxide, dimethyl carbonate, and cyanogen bromide and aqueous base and acid there will be obtained, respectively, trimethyl 1,3,5-benzenetris(cyanoacetate) and tetramethyl 12,4,5,-benzenetetrakis(cyanoacetate) and 1,3,5-benzenetris(malononitrile) and 1,2,3,5-benzenetetrakis(malononitrile).

In similar fashion from succinonitrile and adiponitrile, diethyl carbonate, sodium ethoxide, and cyanogen chloride and aqueous base and acid there wil lbe obtained, respectively, diethyl α,α,α'α'-tetracyanosuccinate and diethyl α,α,α',α'-tetracyanoadipate, tetracyanoethane and 1,1,4,4-tetracyanobutane and, finally, tetracyanoethylene and 1,1,4,4-tetracyano-1,3-butadiene.

Similarly, from 2-(1-hydroxyhexafluoroisopropyl)-p-xylylene dicyanide and 2,5-bis(1-hydroxyhexafluoroisopropyl)-p-xylylene dicyanide, sodium methylate, dimethyl carbonate and cyanogen chloride and aqueous base and acid there will be obtained, respectively, dimethyl 2-(1-hydroxyhexafluoroisopropyl) - p - xylylenebis(cyanoacetate) and dimethyl 2,5-bis(1-hydroxyhexafluoroisopropyl)-p-xylylene-bis(cyanoacetate), 2-(1-hydroxyhexafluoroisopropyl)-1,4-phenylenedimalononitrile, and 2,5-bis-(1 - hydroxyhexafluoroisopropyl) - 1,4 - phenylenedimalononitrile, and 2-(1-hydroxyhexafluoroisopropyl)-7,7,8,-8-tetracyanoquinodimethan and 2,5-bis(1-hydroxyhexafluoroisopropyl)-7,7,8,8-tetracyanoquinodimethan.

Similarly, from 2,3,5,6-tetramethyl-p-xylylene dicyanide, sodium methoxide, dimethyl carbonate, and cyanogen chloride and aqueous base and acid there will be obtained dimethyl 2,3,5,6-tetramethyl-1,4-phenylenebis(cyanoacetate), 2,3,5,6-tetramethyl - 1,4,phenylenedimalononitrile, and 2,3,5,6 - tetramethyl - 7,7,8,8-teracyanoquinodimethan.

Similarly, from 2-vinyl- and 2-vinyloxy-p-xylylene dicyanide, sodium methoxide, dimethyl carbonate, and cyanogen chloride and aqueous base and acid there will be obtained, respectively, dimethyl 2-vinyl- and 2-vinyloxy-1,4-phenylenebis(cyanoacetates), 2-vinyl- and 2-vinyloxy-1,4-phenylenedimalononitriles, and 2-vinyl- and 2-vinyloxy-7,7,8,8-tetracyanoquinodimethans.

Similarly, from 2-bromo- and 2-ethoxycarbonyl-p-xylylene dicyanides, sodium methoxide, dimethyl carbonate, and cyanogen chloride and aqueous base and acid there will be obtained, respectively, 2-bromo- and 2-ethoxycarbonyl - 1,4 - phenylenebis(cyanoacetates), 2-bromo- and 2-ethoxy carbonyl-1,4-phenylenedimalononitriles, and 2-bromo- and 2-ethoxycarbonyl-7,7,8,8-tetracyanoquinodimethans.

Of the reactant $R(CH_2CN)_n$, R is preferably alkyl or aryl when $n$ is 1 and alkylene or arylene when $n$ is 2. Of the arylenes, p-arylenes are most preferred, especially those who have no substituents. Preferred substitutents on R include alkyl or aryl.

The embodiments of the invention in which an exclusive property or privilege is claimed are defined as follows:

1. Process for preparing a compound having the formula

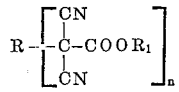

which comprises reacting a compound having the formula

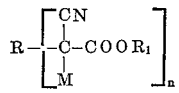

wherein $n$ is a cardinal number of 1 through 4 and when $n$ is 1, R is aryl of up to 15 carbon atoms, and when $n$ is 2, 3, or 4, R is alkylene, aryline, substituted alkylene or substituted arylene each of up to a total of 15 carbon atoms, said substituents being selected from lower alkyl, halogen, lower alkoxy, nitrile, halo-lower-alkyl, lower alkoxycarbonyl, arylmercapto,

arylsulfonyl, vinyl and vinyloxy, $R_1$ and $R_2$ are lower alkyl and M is an alkali metal or alkaline earth metal; with the compound XCN when X is a halogen of atomic number 17–35, inclusive at a temperature of 5 to 100° C.

2. Process for preparing compounds having the formula

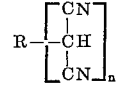

which comprises:
(1) reacting a compound having the formula

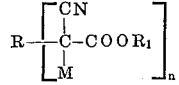

wherein $n$ is a cardinal number of 1 through 4; and when $n$ is 1, R is aryl of up to 15 carbon atoms, and when $n$ is 2, 3 or 4, R is alkylene, arylene, substituted alkylene or substituted arylene each of up to a total of 15 carbon atoms, said substituents being selected from lower alkyl, halogen, lower alkoxy, nitrile, halo-lower-alkyl, lower alkoxycarbonyl, arylmercapto,

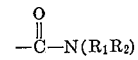

arylsulfonyl, vinyl, and vinyloxy, $R_1$ and $R_2$ are lower alkyl and M is alkali metal or alkaline earth metal; with the compound XCN wherein X is a halogen of atomic number 17–35 inclusive at a temperature of 5 to 100° C.,
(2) reacting the solid obtained in step (1) with an equimolar amount of an aqueous base, and then with an equimolar amount of an aqueous acid at a temperature between room temperature and 100° C.

3. The process of claim 2 wherein R is p-arylene.
4. The process of claim 3 wherein R is p-phenylene.
5. Process for preparing a compound having the formula

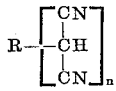

which comprises:
(1) reacting a compound having the formula $$R-(CH_2CN)_n$$

wherein $n$ is a cardinal number of 1 through 4; and when $n$ is 1, R is aryl of up to 15 carbon atoms; and when $n$ is 2, 3 or 4, R is alkylene, arylene, substituted alkylene or substituted arylene each of up to a total of 15 carbon atoms, said substituents being selected from lower alkyl, halogen, lower alkoxy, nitrile, halo-lower-alkyl, lower alkoxycarbonyl, arylmercapto,

arylsulfonyl, vinyl and vinyloxy, with a dihydrocarbyl carbonate of the formula $(R_1O)_2CO$ wherein $R_1$ is a lower alkyl group, in the presence of a compound of the formula $MOR_2$ wherein M is an alkali metal or alkaline earth metal of atomic number 3–56, inclusive, and $R_2$ is a lower alkyl group, at a temperature of 25 to 200° C.,
(2) adding the compound XCN wherein X is halogen of atomic number 17–53, inclusive, at a temperature of 5 to 100° C.,
(3) reacting the solid obtained in step (2) with an equimolar amount of an aqueous base, then with an equimolar amount of a strong mineral acid at a temperature between room temperature and 100° C.

6. The process of claim 5 wherein $n$ is 1 and R is aryl as defined in claim 5.
7. The process of claim 6 wherein the compound $R(CH_2CN)$ is phenylacetonitrile and the product prepared is phenylmalononitrile.
8. The process of claim 5 wherein $n$ is 2 and R is arylene or substituted arylene as defined in claim 5.
9. The process of claim 8 wherein the compound $R(CH_2CN)_2$ is p-xylylene dicyanide and the product prepared is 1,4-bis(dicyanomethyl)benzene.
10. The process of claim 8 wherein R is paraarylene.
11. Process for preparing a tetracyanoquinodimethan which comprises:
(1) reacting at a temperature of 5–100° C. a compound of the formula

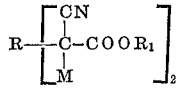

wherein R is arylene or substituted arylene each of up to a total of 15 carbon atoms, the substituents on arylene being selected from the group consisting of lower alkyl, halogen, lower alkoxy, nitrile, halo-lower-alkyl, lower alkoxycarbonyl, arylmercapto,

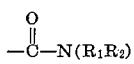

arylsulfonyl, vinyl and vinyloxy; $R_1$ and $R_2$ are lower alkyl and M is an alkali or alkaline earth metal with the compound XCN, wherein X is a halogen atom of atomic number 17–35, inclusive;
(2) reacting the solid obtained in step (1) with an equimolar amount of an aqueous base and then with an equimolar amount of an aqueous acid at a temperature between room temperature and 100° C. to produce a compound of the formula

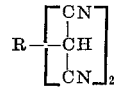

wherein R is as defined in step (1); and
(3) oxidizing the compound of step (2) at a temperature of 30–100° C.

12. The process of claim 11 wherein R is p-phenylene.
13. Process for preparing a tetracyanoquinodimethan which comprises:
(1) reacting at a temperature of 25–200° C. a compound of the formula $$R-(CH_2CN)_2$$

wherein R is arylene or substituted arylene each of up to a total of 15 carbon atoms, the substituents on arylene being selected from the group consisting of lower alkyl, halogen, lower alkoxy, nitrile, halo-lower-alkyl, lower alkoxycarbonyl, arylmercapto,

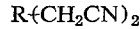

arylsulfonyl, vinyl and vinyloxy and $R_1$ and $R_2$ are lower alkyl with a dihydrocarbyl carbonate of the formula $(R_1O)_2CO$, wherein $R_1$ is a lower alkyl group in the presence of a compound of the formula $MOR_2$, wherein M is an alkali or alkaline earth metal of atomic number 3–56, inclusive and $R_2$ is lower alkyl;
(2) adding at a temperature of 5–100° C. the compound XCN wherein X is halogen of atomic number 17–53, inclusive;
(3) reacting the solid obtained in step (2) with an equimolar amount of an aqueous base and then with an equimolar amount of a strong mineral acid at a temperature between room temperature and 100° C. to produce a compound of the formula

wherein R is as defined in step (1); and
(4) oxidizing the compound of step (3) at a temperature of 30–100° C.

14. The process of claim 13 wherein R is p-phenylene.
15. Compounds of the formula

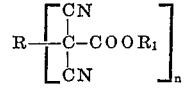

wherein $R_1$ is lower alkyl, $n$ is from 2 to 4, and R is p-arylene of up to 15 carbon atoms which can contain substituents selected from lower alkyl, halogen, lower alkoxy, nitrile, halo-lower alkyl, lower alkoxycarbonyl, arylmercapto,

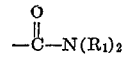

arylsulfonyl, vinyl and vinyloxy.
16. The compound of claim 15 wherein R is p-phenylene and $R_1$ is methyl.

References Cited

UNITED STATES PATENTS 3,115,506  12/1963  Acker et al. _____ 260—396

LORRAINE A. WEINBERGER, Primary Examiner

L. A. THAXTON, Assistant Examiner

U.S. Cl. X.R.

96—63; 260—369, 464, 465, 465.4, 465.6, 465.8, 465.9 465.7